(12) United States Patent
McQuerry

(10) Patent No.: US 8,618,441 B2
(45) Date of Patent: Dec. 31, 2013

(54) OUTPUT CONTROL FOR AUTO-RECONNECT WELDING/CUTTING EQUIPMENT

(75) Inventor: Steven McQuerry, Aurora, OH (US)

(73) Assignee: Lincoln Global, Inc., City of Industry, CA (US)

( * ) Notice: Subject to any disclaimer, the term of this patent is extended or adjusted under 35 U.S.C. 154(b) by 524 days.

(21) Appl. No.: 12/897,811

(22) Filed: Oct. 5, 2010

(65) Prior Publication Data

US 2012/0080409 A1    Apr. 5, 2012

(51) Int. Cl.
  *B23K 9/10* (2006.01)
  *B23K 11/24* (2006.01)
  *H02M 1/10* (2006.01)

(52) U.S. Cl.
  USPC .............................. 219/137 PS; 219/130.21

(58) Field of Classification Search
  USPC .......... 307/151, 125, 126, 130, 131; 363/142; 219/130.1, 130.21, 130.32, 130.33, 219/137 PS, 68, 69.1
  See application file for complete search history.

(56) References Cited

U.S. PATENT DOCUMENTS

| | | | |
|---|---|---|---|
| 5,073,695 A | 12/1991 | Gilliland | |
| 5,185,513 A | 2/1993 | Pacileo | |
| 5,319,533 A * | 6/1994 | Reynolds et al. | 363/143 |
| 5,449,877 A | 9/1995 | Buda et al. | |
| 5,991,169 A | 11/1999 | Kooken | |
| 6,507,004 B2 * | 1/2003 | Ikeda et al. | 219/130.21 |
| 6,897,406 B2 | 5/2005 | Crisler, III et al. | |
| 7,049,546 B2 * | 5/2006 | Thommes | 219/130.21 |
| 7,217,904 B2 | 5/2007 | Blankenship et al. | |
| 7,323,658 B2 | 1/2008 | Rice et al. | |
| 7,573,002 B2 | 8/2009 | Myers et al. | |
| 7,751,926 B2 | 7/2010 | DiVenere et al. | |

(Continued)

FOREIGN PATENT DOCUMENTS

| | | |
|---|---|---|
| DE | 43 05 339 A1 | 3/1994 |
| WO | 2008090502 A1 | 7/2008 |

OTHER PUBLICATIONS

Pro-Cut 25, Lincoln Electric The Welding Experts, Publication E11.51, dated Jun. 2007, pp. 1-4, www.lincolnelectric.com, Cleveland, OH.

(Continued)

*Primary Examiner* — Geoffrey S Evans
(74) *Attorney, Agent, or Firm* — Hahn Loeser & Parks, LLP

(57) ABSTRACT

Apparatus and methods for automatically recalibrating an output current range of a user output current control encoder of an auto-reconnect welding/cutting device. When an input power type connected to an auto-reconnect device is changed, the calibrated range of the user output current control encoder (e.g., output control knob) is automatically transformed in response to the auto-reconnect device sensing at least one characteristic of the input power type. As a result, when a user adjusts the encoder to its maximum full-scale setting, too much current will not be drawn by the auto-reconnect device which would cause a circuit protection component (e.g., a circuit breaker or a fuse) associated with the input power type to trip. Instead, the current that is drawn when the encoder is set to the maximum full-scale setting is no more than about a rated current of the circuit protection component.

22 Claims, 5 Drawing Sheets

(56) References Cited

U.S. PATENT DOCUMENTS

| | | |
|---|---|---|
| 2006/0054610 A1* | 3/2006 | Morimoto et al. ......... 219/130.5 |
| 2006/0072266 A1* | 4/2006 | Yun ............................... 361/90 |
| 2006/0138095 A1 | 6/2006 | Stellwag et al. |
| 2006/0196862 A1 | 9/2006 | Sickels |
| 2006/0198171 A1 | 9/2006 | Samodell |
| 2006/0213887 A1 | 9/2006 | Kaufman et al. |
| 2008/0047942 A1 | 2/2008 | Laabs et al. |
| 2008/0073330 A1 | 3/2008 | Diedrick et al. |

OTHER PUBLICATIONS

PCT/IB2011/002335 International Search Report dated Mar. 5, 2011.

PCT/IB2011/002335 Written Opinion dated Mar. 5, 2011.

* cited by examiner

OUTPUT CONTROL FOR AUTO-RECONNECT WELDING/CUTTING EQUIPMENT

TECHNICAL FIELD

Certain embodiments relate to auto-reconnect equipment. More particularly, certain embodiments relate to the automatic transformation of a calibrated range of an output controller of auto-reconnect equipment in response to a change in connected input power type.

BACKGROUND

Certain types of multiple input equipment, such as multiple input welding or cutting equipment, employ an auto-reconnect capability. When a different type of input power is connected to the equipment, the auto-reconnect capability automatically reconfigures the circuitry of the equipment to handle the different input power type. However, the output power produced by the equipment will change as well when the input power type is changed. The output control knob of today's auto-reconnect machines have markings which communicate to the end user the output control knob limits compared to the input power connected to the machine. If an end user adjusts the output control knob beyond the limit defined by the connected input power, the machine may draw too much current causing a circuit protection component associated with the input power to trip and cut off the input power to the machine. This can be very frustrating to the user, who has to manually re-adjust the output control knob and reset the circuit protection component in order to continue using the machine.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Embodiments of the present invention comprise auto-reconnect devices and methods for automatically transforming a calibrated range of a user output current control encoder. When the input power type connected to an auto-reconnect device is changed, the calibrated range of the user output current control encoder (e.g., output control knob) is automatically transformed such that, when a user adjusts the encoder to its maximum full-scale setting, too much current will not be drawn by the auto-reconnect device which would cause a circuit protection component (e.g., a circuit breaker) to trip. Instead, the current that is drawn when the encoder is set to the maximum full-scale setting is no more than a rated current of the circuit protection component. This rated current changes as the input power type that is connected to the auto-reconnect device is changed.

These and other features of the claimed invention, as well as details of illustrated embodiments thereof, will be more fully understood from the following description and drawings.

DETAILED DESCRIPTION

Figure 1:
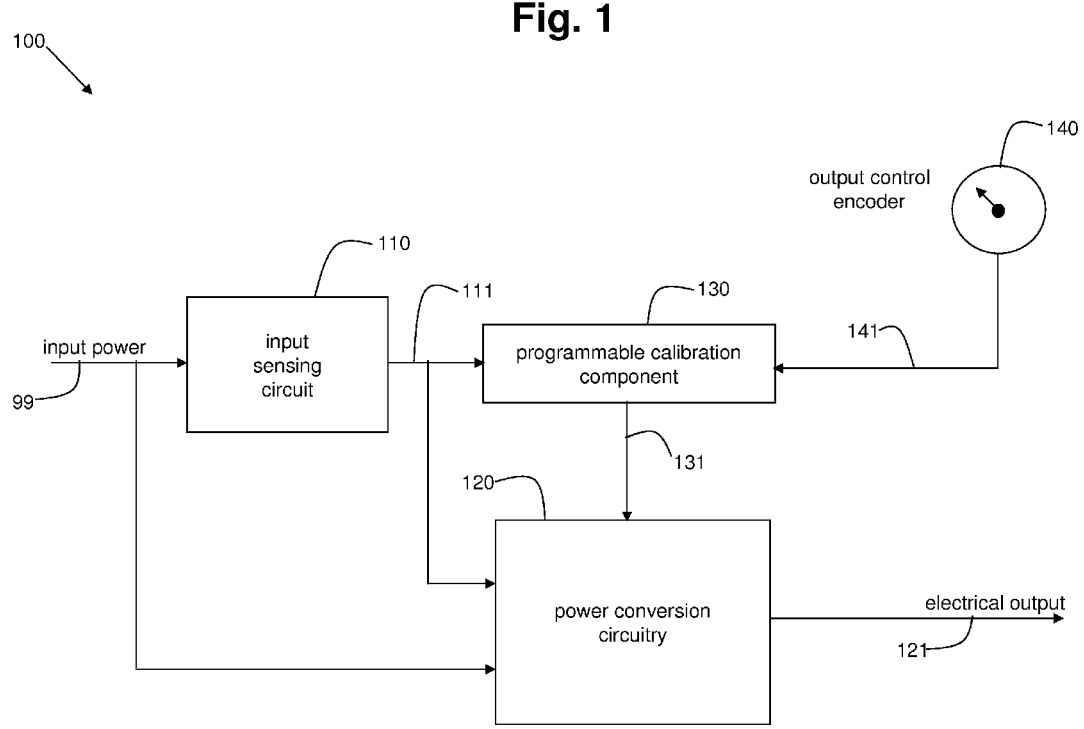
FIG. 1 illustrates a schematic block diagram of a general embodiment of an auto-reconnect device.

The term "rated current", as used herein, is the maximum current level (e.g., in amps) that can be continuously drawn by an auto-reconnect device without triggering the opening of a circuit protection component (e.g., a circuit breaker or an electrical fuse) associated with the input power type connected to the auto-reconnect device.

An embodiment of the present invention comprises an auto-reconnect welding or cutting device capable of accepting multiple electrical input power types, one at a time, and generating a range of selectable output current levels. The auto-reconnect device is configured to sense at least one characteristic of an input power type connected to the auto-reconnect device and transform a calibrated range of a user output current control encoder of the auto-reconnect device in response to the sensed characteristic of the input power type. The transformed calibrated range allows no more than about a rated current of a circuit protection component associated with the input power type to be drawn by the auto-reconnect device when the output current control encoder is set to a maximum full-scale setting.

Another embodiment of the present invention comprises an auto-reconnect welding or cutting device capable of accepting multiple electrical input power types, one at a time, and generating a range of selectable output current levels. The auto-reconnect device includes means for generating an output current from a provided input power type, and a user output current control encoder. The encoder may be an analog encoder (e.g., a potentiometer) or a digital encoder (e.g., a digital dial). The auto-reconnect device also includes means for sensing at least one characteristic of the input power type and means for re-calibrating a selectable range of the user output current control encoder in response to the sensed characteristic. The means for re-calibrating may include at least one of a software programmable hardware component and a firmware programmable hardware component. The means for generating and the means for re-calibrating allow no more than about a rated current of a circuit protection component associated with the input power type to be drawn by the auto-reconnect device when the output current control encoder is set to a maximum full-scale setting of the selectable range. The auto-reconnect device may further include means for reconfiguring the means for generating an output current in response to applying a different input power type to the auto-reconnect device.

A further embodiment of the present invention comprises an auto-reconnect welding or cutting device capable of accepting multiple electrical input power types, one at a time, and generating a range of selectable output current levels. The auto-reconnect device includes a voltage sensing circuit configured to sense a voltage of an applied electrical input power type and to generate a sensed value being representative of a sensed voltage. The auto-reconnect device also includes an auto-reconnect circuit operatively connected to the voltage sensing circuit and configured to provide an auto-reconnect capability responsive to the sensed value to accommodate at least two different electrical input power types. The auto-reconnect device further includes an output current control encoder providing a user-adjustable current range. The auto-reconnect device also includes a programmable component operatively connected to the voltage sensing circuit and the output current control encoder. The programmable component may be a software programmable processor or an addressable look-up-table, for example. The programmable component is responsive to an output of the encoder, wherein the programmable component is programmed to re-calibrate the user-adjustable current range of the output current control encoder in response to the sensed voltage value. No more than about a rated current of a circuit protection component associated with the applied input power type is able to be drawn by the auto-reconnect device when the output current control encoder is set to a maximum full-scale setting of the user-adjustable current range. The auto-reconnect device also includes a power supply operatively connected to the auto-reconnect circuit and the programmable component. The power supply includes rectifier circuitry configured to rectify an input power type to generate a rectified power type. The power supply also includes inverter circuitry for generating an output current from the rectified power type. The power supply is configured to produce an output current level in response to an output of the programmable component, wherein the output of the programmable component is dependent on the output of the encoder.

FIG. 1 illustrates a schematic block diagram of a general embodiment of an auto-reconnect device 100. The device 100 may be, for example, a welding device (e.g., an arc welder) or a cutting device (e.g., a plasma cutter). The device 100 operates by being provided with one of at least two types of input power (e.g., 115 VAC at 15 amps or 230 VAC at 30 amps). Other input power types are possible as well, in accordance with various embodiments of the present invention. The device 100 includes an input sensing circuit 110. The sensing circuit 110 is configured to sense at least one characteristic of the input power type 99. Such characteristics may include, for example, a voltage level, a current level, a power level, a frequency (period), and a phase relationship. Other characteristics may be possible as well.

Figure 5:
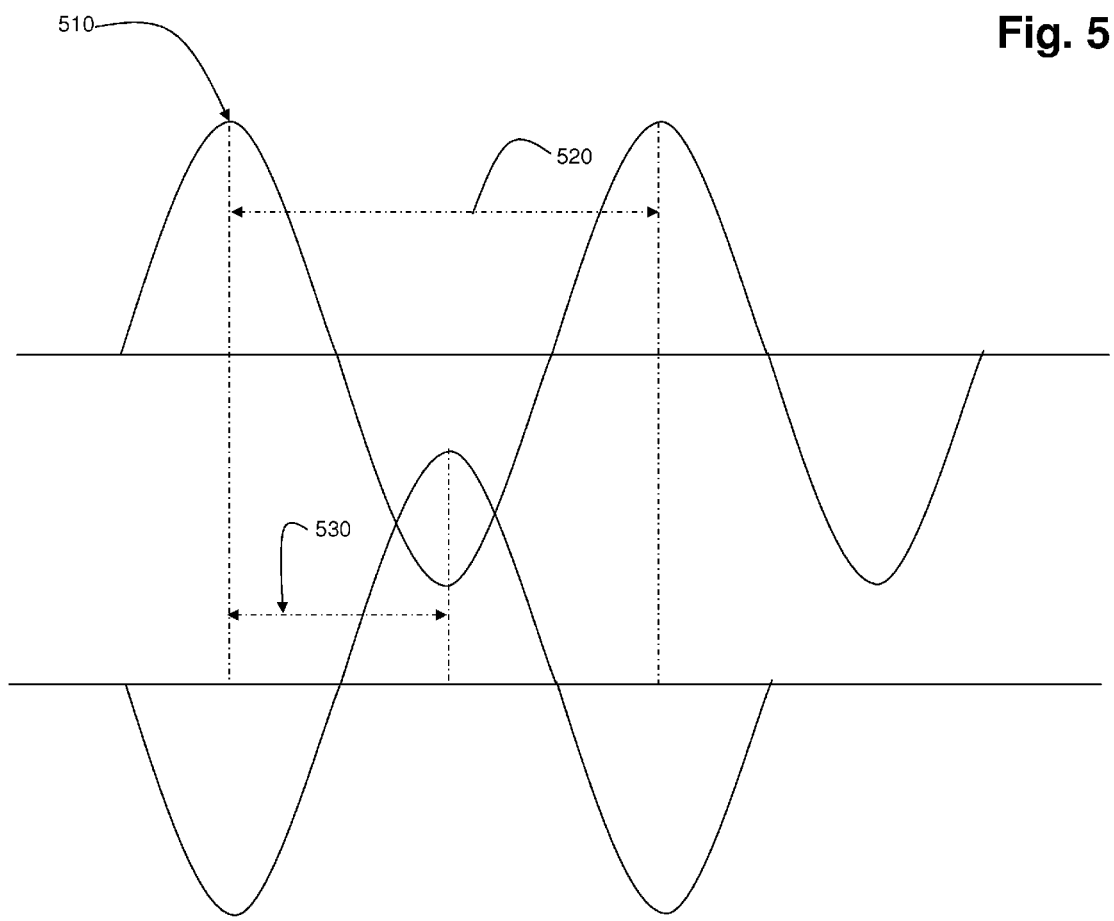
FIG. 5 illustrates examples of various characteristics of an input power type.

The sensed voltage level may correspond to a peak voltage level of an AC voltage of the input power type 99, for example. The sensed current level may correspond to a particular number of amps that are drawn through a resistive path of the input power sensing circuit 110 when the input power 99 is applied, for example. The sensed power level may correspond to a particular number of watts (e.g., average current times average voltage) that are dissipated through a resistive path of the input power sensing circuit 110 when the input power 99 is applied, for example. The sensed frequency or period may correspond to a measured 60 Hz AC frequency or 50 Hz AC frequency of the input power type 99, for example. The sensed phase relationship may correspond to the measured phase delay between two phases of a three-phase input power type, for example. FIG. 5 illustrates examples of various characteristics of an input power type, including a peak level 510 (e.g., a peak voltage or a peak current or a peak power), a period 520, and a phase relationship 530. The sine waves of FIG. 5 are representative examples of input power type voltages, currents, power, and/or phases.

The auto-reconnect device 100 also includes power conversion circuitry 120 and a programmable calibration component 130. The output signal 111 (being representative of the sensed characteristic) of the input sensing circuit 110 is input to the programmable calibration component 130 and the power conversion circuitry 120. The auto-reconnect device 100 further includes a user output control encoder (OCE) 140 (e.g., an output control knob) allowing a user to adjust a level of an electrical output characteristic 121 of the auto-reconnect device 100.

Figure 4:
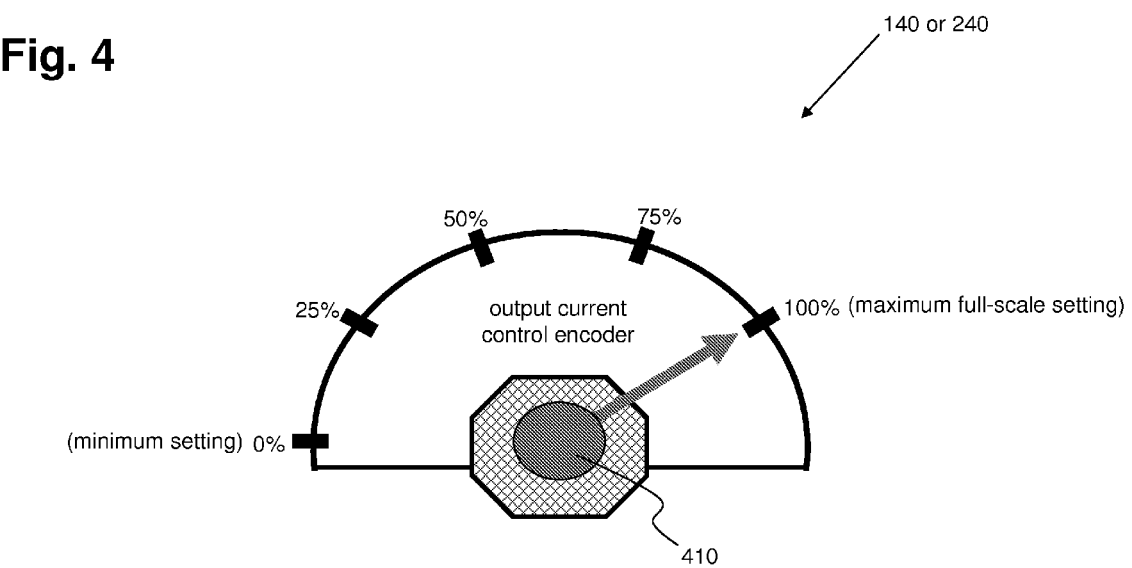
FIG. 4 illustrates an example embodiment of an output current control encoder of the auto-reconnect device of FIG. 1 or FIG. 2, providing a calibrated range of output current and having a maximum full-scale setting.

FIG. 4 illustrates an example embodiment of an output current control encoder 140 (or 240) of the auto-reconnect device 100 (or 200) of FIG. 1 (or FIG. 2), providing a calibrated range of output current and having a maximum full-scale setting.

Referring to FIG. 4, the OCE 140 may indicate a range having a minimum setting of 0% through a maximum full-scale setting of 100%. The OCE 140 includes a knob 410 which may be adjusted by a user to change the setting of the OCE 140 to anywhere between 0% and 100% (e.g., 25%). In accordance with an embodiment of the present invention, the auto-reconnect device 100 is adaptable, in response to the connected input power 99, to change the calibrated range of the electrical output characteristic 121 associated with the 0-100% range of the OCE 140.

For example, the electrical output characteristic 121 may be an output current, for example. For a first input power type, a 0% setting may provide an output current 121 of 0 amps and a 100% setting may provide an output current 121 of 15 amps. For a second input power type, a 0% setting may provide an output current 121 of 15 amps and a 100% setting may provide an output current 121 of 30 amps. In both cases, however, the amount of current drawn by the auto-reconnect device 100 from the connected input power 99 does not exceed the rated current of a circuit protection device associated with the input power type 99 when the OCE 140 is set to 100%. In general, the output current range is a function of the input voltage, efficiency, heating, component ratings, and other factors associated with the auto-reconnect device.

Functionally, the input sensing circuit 110 senses a characteristic of the input power 99 that is connected to the auto-reconnect device 100. The output signal 111, representing the sensed characteristic, is provided to the programmable calibration component 130 and the power conversion circuitry 120. The programmable calibration component 130 responds to the output signal 111 by re-calibrating a selectable range of the OCE 140 as is explained later in more detail herein. The OCE 140 outputs an encoded signal 141 to the programmable calibration component 130 based on a user selectable setting of the OCE 140. The programmable calibration component 130 generates an output signal 131 to the power conversion circuitry 120 in response to the output signal 111 and the encoded signal 141. The power conversion circuitry 120 responds to the output signal 111 by reconfiguring itself to accept and handle the input power type 99 and generate a corresponding electrical output 121 from the input power 99 based on the output signal 131 of the programmable calibration component 130.

As an example, when a 230 VAC input power type 99, having a rated current of 30 amps, is connected to the auto-reconnect device 100, the input sensing circuit 110 senses a current of 25 amps being drawn through a resistive path of the sensing circuit 110 which correlates to the 230 VAC input power type 99. In this example, the programmable calibration component 130 is a look-up-table (LUT) in the form of an EEPROM. The input sensing circuit 110 sends an output signal 111, being indicative of the 230 VAC input power type, to the LUT 130 and to the power conversion circuitry 120. The output signal 111 serves as a selector into the LUT 130, causing a portion of the LUT 130 corresponding to the 230

VAC input power type 99 to be selected. This selected portion of the LUT 130 is programmed to command a calibrated range of output current 121 of 0 amps to 20 amps over the full scale range (0% to 100%) of the OCE 140 without drawing more than the rated 30 amps from the 230 VAC input power type 99 at an OCE setting of 100%.

The encoded signal 141 acts as an address into the selected portion of the LUT 130. When the OCE 140 is set to its minimum setting (e.g., 0%), the encoded signal 141 addresses the LUT 130 such that the output signal 131 of the LUT 130 commands the power conversion circuitry 120 to provide an output current 121 of 10 amps. When the OCE 140 is set to its maximum full-range setting (e.g., 100%), the encoded signal 141 addresses the LUT 130 such that the output signal 131 of the LUT 130 commands the power conversion circuitry 120 to provide an output current 121 of 25 amps without drawing more than the rated 30 amps from the input power type 99. Any OCE setting being between the minimum setting and the maximum setting will result in an output signal 131 corresponding to some output current value between 10 amps and 25 amps, depending on the exact OCE setting. As a result, in this example embodiment, the power conversion circuitry 120 will provide an output current 121 of between 10 amps and 25 amps, depending on the OCE setting and resultant output signal 131.

The calibrated range may be linear or non-linear. For example, as the OCE 140 is adjusted linearly from a setting of 0% to a setting of 100%, the resultant output current 121 may vary linearly from 10 amps to 25 amps. Alternatively, the LUT 130 could be programmed such that, as the OCE 140 is adjusted linearly from a setting of 0% to a setting of 100%, the resultant output current 121 varies logarithmically from 10 amps to 25 amps. Other markings on the OCE 140 may be provided to indicate the linear or the non-linear mapping enabled by the programmable calibration component 130 as a function of the connected input power type.

Figure 2:
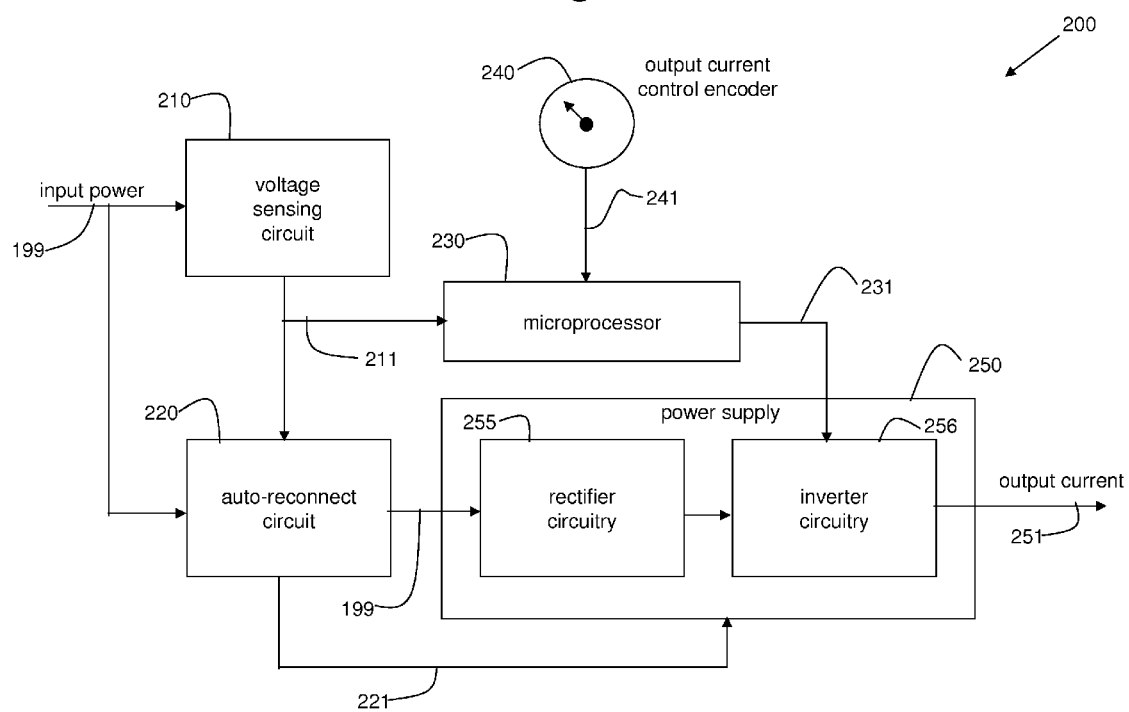
FIG. 2 illustrates a schematic block diagram of a more particular embodiment of an auto-reconnect device.

Instead of a LUT, the programmable calibration component 130 may be a software programmable processor which reads the output signal 111 and the encoded signal 141 and produces the output signal 131 in response to the signals 111 and 141. For example, FIG. 2 illustrates a schematic block diagram of a more particular embodiment of an auto-reconnect device 200. The device 200 includes a voltage sensing circuit 210. The sensing circuit 110 is configured to sense a characteristic voltage of the input power type 199. For example, the sensed voltage level may correspond to a peak voltage level of an AC voltage of the input power type 199 (see FIG. 5). The voltage sensing circuit 210 may include a pre-charge circuit having a capacitor that charges up to a sensed voltage level, for example, and at least one voltage comparator. Voltage sensing circuits are well known in the art.

The auto-reconnect device 200 also includes an auto-reconnect (AR) circuit 220, a power supply (PS) 250, and a microprocessor 130 (i.e., a software programmable processor). The microprocessor 230 of FIG. 2 functions as the programmable calibration component 130 of FIG. 1. The PS 250 includes rectifier circuitry 255 and inverter circuitry 256. The inverter circuitry 256 is a type of switched DC-to-DC converter circuitry, in accordance with an embodiment of the present invention. The auto-reconnect circuit 220, the rectifier circuitry 255, and the inverter circuitry 256 of FIG. 2 function as the power conversion circuitry 120 of FIG. 1.

In accordance with an alternative embodiment of the present invention, the voltage sensing circuit 210 is an integral part of the auto-reconnect circuit 220. Auto-reconnect circuits, rectifier circuitry, and inverter circuitry are well known in the art. In accordance with other alternative embodiments of the present invention, the inverter circuitry 256 may be replaced with other types of DC-to-DC converter circuitry such as chopper circuitry, for example.

The output signal 211 (being representative of the sensed voltage) of the voltage sensing circuit 210 is input to the microprocessor 230 and the AR circuit 220. The auto-reconnect device 200 further includes a user output current control encoder (OCCE) 240 (e.g., an output control knob) allowing a user to adjust a level of the output current 251 of the auto-reconnect device 200. User output current control encoders are well known in the art.

Functionally, the voltage sensing circuit 210 senses a voltage level of the input power 199 that is connected to the auto-reconnect device 200. The output signal 211, representing the sensed voltage, is provided to the microprocessor 230 and the AR circuit 220. The microprocessor 230 responds to the output signal 211 by re-calibrating a selectable range of the OCCE 240 as is explained later in more detail herein. The OCCE 240 outputs an encoded signal 241 to the microprocessor 230 based on a user selectable setting of the OCCE 240 (e.g., between 0% and 100%). The microprocessor 230 generates an output signal 231 to the inverter circuitry 256 of the power supply 250 in response to the output signal 211 and the encoded signal 241. The AR circuit 220 generates an output signal 221 in response to the output signal 211 from the voltage sensing circuit 210. The power supply 250 responds to the output signal 221 by reconfiguring itself to accept and handle the input power type 199, which is passed to the rectifier circuitry 255 of the power supply 250 by the AR circuit 220, and by generating a corresponding output current 251 from the input power 199 based on the output signal 231 of the microprocessor 230. In accordance with an embodiment of the present invention, the auto-reconnect circuit 220 includes a plurality of relay switches configured to provide an auto-reconnect capability.

As an example, when a 115 VAC input power type 199, having a rated current of 20 amps, is connected to the auto-reconnect device 200, the voltage sensing circuit 210 senses a peak voltage of 115 volts which correlates to the 115 VAC input power type 199. The voltage sensing circuit 210 sends an output signal 211, being indicative of the 115 VAC input power type 199, to the microprocessor 230 and to the AR circuit 220. The output signal 211 serves as an interrupt to the microprocessor 230 and causes the microprocessor 230 to re-calculate the calibrated range of the user OCCE 240. The newly calibrated range is calculated to provide a calibrated range of output current 251 from 10 amps to 15 amps, for example, without drawing more than the rated 20 amps from the 115 VAC input power type 199.

The encoded signal 241 acts as an input to the microprocessor 230. When the OCCE 240 is set to its minimum setting (e.g., 0%), the encoded signal 241 tells the microprocessor to output a signal 231 to the inverter circuitry 256 to produce 10 amps of output current 251. When the OCCE 240 is set to its maximum full-range setting (e.g., 100%), the encoded signal 241 tells the microprocessor to output a signal 231 to the inverter circuitry 256 to provide 15 amps of output current 251. Any OCCE setting being between the minimum setting and the maximum setting will result in an output signal 231 to the inverter circuitry 256 corresponding to some value between 0 amps and 15 amps, depending on the exact OCCE setting. As a result, in this example embodiment, the inverter circuitry 256 of the power supply 250 will be commanded by the output signal 231 to provide an output current 251 of between 10 amps and 15 amps, depending on the OCCE setting and resultant output signal 231 from the microprocessor.

Figure 3:
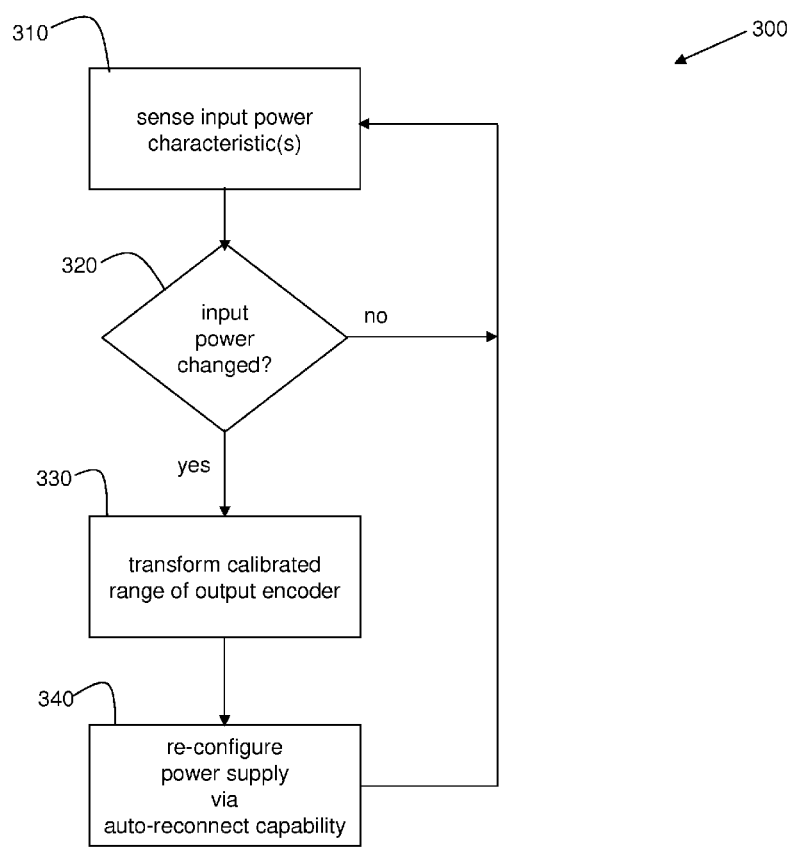
FIG. 3 is a flowchart of an example embodiment of a method of how the auto-reconnect devices of FIG. 1 and FIG. 2 automatically adapt when the connected input power type is changed.

FIG. 3 is a flowchart of an example embodiment of a method 300 of how the auto-reconnect devices 100 and 200 of FIG. 1 and FIG. 2 automatically adapt when the connected input power type is changed. In step 310, at least one input power characteristic (e.g., a voltage, a current, a power, a frequency, a phase) of a connected input power type is sensed or detected by the auto-reconnect device. In step 320, if the input power type has not changed, then the method reverts back to step 310 where the auto-reconnect device continues to monitor at least one characteristic of the connected input power. In step 320, if the input power type has changed then, in step 330, a calibrated range of an output encoder of the auto-reconnect device is transformed (e.g., remapped) and, in step 340, a power supply of the auto-reconnect device is re-configured, via an auto-reconnect capability of the auto-reconnect device, to accommodate the changed input power type.

For example, the OCCE 240 of FIG. 2 may output an encoder signal 241 having a same encoder range of 0% to 100%. However, the resultant output current levels to which the encoder range of 0-100% is mapped (i.e., the calibrated range of the OCCE 240) change in dependence on the connected input power type 199. The microprocessor 230 performs the transformation of the calibrated range of the OCCE 240. Alternatively, a LUT 130 may perform the transformation of the calibrated range of the OCCE 240 as previously discussed herein.

In summary, apparatus and methods for automatically recalibrating an output current range of a user output current control encoder of an auto-reconnect welding/cutting device are disclosed. When the input power type connected to an auto-reconnect device is changed, the calibrated range of the user output current control encoder (e.g., output control knob) is automatically transformed in response to the auto-reconnect device sensing at least one characteristic of the input power type. As a result, when a user adjusts the encoder to its maximum full-scale setting, too much current will not be drawn by the auto-reconnect device which would cause a circuit protection component (e.g., a circuit breaker or a fuse) associated with the input power type to trip. Instead, the current that is drawn when the encoder is set to the maximum full-scale setting is no more than about a rated current of the circuit protection component. This rated current changes when the input power type that is connected to the auto-reconnect device is changed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. In an auto-reconnect welding or cutting device capable of accepting multiple electrical input power types, one at a time, and generating a range of selectable output current levels, a method comprising:
sensing at least one characteristic of a first input power type connected to said device; and
transforming a calibrated range of a user output current control encoder of said device, in response to said at least one sensed characteristic of said first input power type, resulting in no more than about a first rated current of a first circuit protection component associated with said first input power type being able to be drawn by said device when said output current control encoder is set to a maximum full-scale setting.

2. The method of claim 1 wherein said at least one characteristic of a first input power type includes at least one of a voltage level, a current level, a power level, a frequency, and a phase relationship.

3. The method of claim 1 further comprising:
sensing at least one characteristic of a second input power type connected to said device; and
transforming said calibrated range of said user output current control encoder of said device, in response to said at least one sensed characteristic of said second input power type, resulting in no more than about a second rated current of a second circuit protection component associated with said second input power type being able to be drawn by said device when said output current control encoder is set to said maximum full-scale setting.

4. The method of claim 3 wherein said at least one characteristic of a second input power type includes at least one of a voltage level, a current level, a power (Original) level, a frequency, and a phase relationship.

5. The method of claim 3 further comprising:
sensing at least one characteristic of a third input power type connected to said device; and
transforming said calibrated range of said user output current control encoder of said device, in response to said at least one sensed characteristic of said third input power type, resulting in no more than about a third rated current of a third circuit protection component associated with said third input power type being able to be drawn by said device when said output current control encoder is set to said maximum full-scale setting.

6. The method of claim 5 wherein said at least one characteristic of a third input power type includes at least one of a voltage level, a current level, a power level, a frequency, and a phase relationship.

7. The method of claim 5 wherein each of said first, second, and third circuit protection components includes at least one of a circuit breaker and an electrical fuse.

8. An auto-reconnect welding or cutting device capable of accepting multiple electrical input power types, one at a time, and generating a range of selectable output current levels, said device comprising:
means for generating an output current from a provided input power type;
a user output current control encoder;
means for sensing at least one characteristic of said input power type; and
means for re-calibrating a selectable range of said user output current control encoder, in response to said at least one sensed characteristic of said input power type, resulting in no more than about a rated current of a circuit protection component associated with said input power type being able to be drawn by said device when said output current control encoder is set to a maximum full-scale setting of said selectable range.

9. The device of claim 8 further comprising means for reconfiguring said means for generating an output current in response to applying a different input power type to said device.

10. The device of claim 8 wherein said at least one characteristic of said input power type includes at least one of a voltage level, a current level, a power level, a frequency, and a phase relationship.

11. The device of claim 8 wherein said means for re-calibrating includes at least one of a software programmable hardware component and a firmware programmable hardware component.

12. The device of claim 8 wherein said user output current control encoder is an analog encoder.

13. The device of claim 8 wherein said user output current control encoder is a digital encoder.

14. The device of claim 8 wherein said circuit protection component includes at least one of a circuit breaker and an electrical fuse.

15. An auto-reconnect welding or cutting device capable of accepting multiple electrical input power types, one at a time, and generating a range of selectable output current levels, said device comprising:
- a voltage sensing circuit configured to sense a voltage of an applied electrical input power type and to generate a sensed value being representative of a sensed voltage;
- an auto-reconnect circuit operatively connected to said voltage sensing circuit and configured to provide an auto-reconnect capability responsive to said sensed value to accommodate at least two different electrical input power types;
- an output current control encoder providing a user-adjustable current range;
- a programmable component operatively connected to said voltage sensing circuit and said output current control encoder and responsive to an output of said encoder, wherein said programmable component is programmed to re-calibrate said user-adjustable current range of said output current control encoder in response to said sensed voltage value resulting in no more than about a rated current of a circuit protection component associated with said applied input power type being able to be drawn by said device when said output current control encoder is set to a maximum full-scale setting of said user-adjustable current range.

16. The device of claim 15 further comprising a power supply operatively connected to said auto-reconnect circuit and said programmable component and configured to produce an output current level in response to an output of said programmable component, wherein said output of said programmable component is dependent on said output of said encoder.

17. The device of claim 15 wherein said programmable component includes a software programmable processor.

18. The device of claim 15 wherein said programmable component includes an addressable look-up-table.

19. The device of claim 15 wherein said power supply includes:
- rectifier circuitry configured to rectify an input power type to generate a rectified power type; and
- inverter circuitry for generating an output current from said rectified power type.

20. The device of claim 15 wherein said circuit protection component includes at least one of a circuit breaker and an electrical fuse.

21. The device of claim 15 wherein said voltage sensing circuit includes at least one voltage comparator.

22. The device of claim 15 wherein said auto-reconnect circuit includes at least one relay switch.

* * * * *